United States Patent
Huang et al.

(10) Patent No.: US 11,228,514 B2
(45) Date of Patent: Jan. 18, 2022

(54) NETWORK DIAGNOSIS METHOD, CLOUD INTELLIGENT ROBOT, NETWORK DEVICE AND PRIVATE NETWORK

(71) Applicant: CloudMinds (Shanghai) Robotics Co., Ltd., Shanghai (CN)

(72) Inventors: William Xiao-Qing Huang, Guangdong (CN); Haitao Jiang, Guangdong (CN); Zhenkai Wang, Guangdong (CN)

(73) Assignee: CloudMinds (Shanghai) Robotics Co., LTD, Shenzhen (CN)

(*) Notice: Subject to any disclaimer, the term of this patent is extended or adjusted under 35 U.S.C. 154(b) by 306 days.

(21) Appl. No.: 16/347,092

(22) PCT Filed: Sep. 1, 2016

(86) PCT No.: PCT/CN2016/097764
§ 371 (c)(1),
(2) Date: May 2, 2019

(87) PCT Pub. No.: WO2018/040048
PCT Pub. Date: Mar. 8, 2018

(65) Prior Publication Data
US 2021/0099369 A1    Apr. 1, 2021

(51) Int. Cl.
*H04L 12/26* (2006.01)
*H04L 12/24* (2006.01)
*H04W 24/04* (2009.01)

(52) U.S. Cl.
CPC .......... *H04L 43/065* (2013.01); *H04L 41/082* (2013.01); *H04L 41/0886* (2013.01);
(Continued)

(58) Field of Classification Search
CPC ... H04L 43/065; H04L 41/0886; H04L 43/10; H04L 43/0817; H04L 41/082; H04W 24/04
See application file for complete search history.

(56) References Cited

U.S. PATENT DOCUMENTS

2008/0253300 A1* 10/2008 Wakabayashi ...... H04W 72/085
                                                                370/252
2011/0116442 A1*  5/2011 Caldwell ............... H04M 7/006
                                                                370/328
(Continued)

FOREIGN PATENT DOCUMENTS

CN        1447240 A    10/2003
CN      101938764 A     1/2011
(Continued)

*Primary Examiner* — Gil H. Lee
*Assistant Examiner* — Juan C Turriate Gastulo
(74) *Attorney, Agent, or Firm* — Vivacqua Crane PLLC

(57) ABSTRACT

A network diagnosis method, a cloud intelligent robot, a network device and a private network, relate to the technical field of communications, and are used for solving the technical problems of having low diagnosis efficiency and leakage risk for a private network in the prior art. The method comprises: an cloud intelligent robot transmitting a network monitoring instruction to a network device in a private network; receiving operation information transmitted by the network device according to the network monitoring instruction; diagnosing the network device according to the operation information to obtain a diagnosis result; and initiating a network configuration information update of the private network according to the diagnosis result.

13 Claims, 4 Drawing Sheets

(52) U.S. Cl.
CPC .......... *H04L 43/0817* (2013.01); *H04L 43/10* (2013.01); *H04W 24/04* (2013.01)

(56) References Cited

U.S. PATENT DOCUMENTS

| | | |
|---|---|---|
| 2013/0326055 A1 | 12/2013 | Chatterjee et al. |
| 2014/0018119 A1* | 1/2014 | Xu ...................... H04W 52/244 455/501 |
| 2015/0052253 A1 | 2/2015 | Johnson et al. |
| 2015/0063327 A1* | 3/2015 | Barriac ............. H04W 72/1289 370/337 |
| 2015/0186206 A1* | 7/2015 | Bhattacharya ...... G06F 11/3409 714/3 |
| 2015/0304983 A1* | 10/2015 | Krening .............. H04W 64/003 370/254 |
| 2017/0207954 A1* | 7/2017 | Yang .................. H04L 41/0681 |
| 2019/0310607 A1* | 10/2019 | Tart .................... G05B 19/4065 |

FOREIGN PATENT DOCUMENTS

| | | | | |
|---|---|---|---|---|
| CN | 101945373 A | * | 1/2011 | ........... H04W 24/08 |
| CN | 101945373 A | | 1/2011 | |
| CN | 102280826 A | | 12/2011 | |
| CN | 101938764 B | * | 3/2014 | ........... H04W 24/10 |
| CN | 104794214 A | | 7/2015 | |
| CN | 105245395 A | | 1/2016 | |
| WO | 2014039865 A1 | | 3/2014 | |

* cited by examiner

NETWORK DIAGNOSIS METHOD, CLOUD INTELLIGENT ROBOT, NETWORK DEVICE AND PRIVATE NETWORK

CROSS-REFERENCE TO RELATED APPLICATION

This application claims the benefit of PCT application No. PCT/CN2016/097764 filed on Sep. 1, 2016, the contents of which are incorporated herein by reference.

FIELD OF THE INVENTION

The present invention relates to the technical field of communications, and in particular to a network diagnosis method, a cloud intelligent robot, a network device and a private network.

BACKGROUND OF THE INVENTION

In the Internet addressing architecture, a private network is a network that uses private IP (Internet Protocol) address space in compliance with the Internet Communication Protocols RFC 1918 and RFC 4193, such as an enterprise-class private wireless office communication network. The enterprise-class private wireless office communication network is provided by a basic telecommunications operator with wireless private network services, or is provided by a third-party network company with wireless private network services based on WiFi (Wireless-Fidelity). At present, a private network is very complicated in network maintenance, and having problems of long time consuming and high cost.

The main reason for the above problems in a private network is that the maintenance of a private network in prior art usually requires an operator or third-party maintenance personnel to enter the office area for manual diagnostic testing, and the labor cost is too high. Moreover, it is inconvenient for third-party network maintenance personnel to enter a confidential office area, it is also inconvenient for the access of the third-party network and testing to a confidential application, and there is a risk of leakage. Therefore, how to more safely and efficiently perform diagnostic maintenance on a private network is an important research topic for a person skilled in the art.

With the development of cloud intelligent technology, the application of cloud intelligent robots has begun to infiltrate into various fields. However, how to use a cloud intelligent robot to diagnose a private network has not been considered by a person skilled in the art.

SUMMARY OF THE INVENTION

The objective of the present disclosure is to provide a network diagnosis method, a cloud intelligent robot, a network device and a private network, for solving the technical problems of having low diagnosis efficiency and leakage risk for a private network in the prior art.

In order to achieve the above objective, in a first aspect, provided in the present invention is a network diagnosis method, which is applied to a cloud intelligent robot, the method comprising:

the cloud intelligent robot transmitting a network monitoring instruction to a network device in a private network;

receiving operation information transmitted by the network device according to the network monitoring instruction;

diagnosing the network device according to the operation information to obtain a diagnosis result; and initiating a network configuration information update of the private network according to the diagnosis result.

In a second aspect, provided in the present invention is another network diagnosis method, which is applied to a network device in a private network, the method comprising:

the network device receiving a network monitoring instruction transmitted by a cloud intelligent robot; and transmitting operation information of the network device to the cloud intelligent robot according to the network monitoring instruction, wherein the operation information is used by the cloud intelligent robot to diagnose the network device.

In a third aspect, provided in the present invention is a cloud intelligent robot, comprising:

a transmitting unit, configured to transmit a network monitoring instruction to a network device in a private network;

a receiving unit, configured to receive operation information transmitted by the network device according to the network monitoring instruction;

a diagnosis unit, configured to diagnose the network device according to the operation information to obtain a diagnosis result; and an update initiating unit, configured to initiate a network configuration information update of the private network according to the diagnosis result.

In a fourth aspect, provided in the present invention is a network device, comprising:

a receiving unit, configured to receive a network monitoring instruction transmitted by a cloud intelligent robot; and a transmitting unit, configured to transmit operation information of the network device to the cloud intelligent robot according to the network monitoring instruction, wherein the operation information is used by the cloud intelligent robot to diagnose the network device.

In a fifth aspect, provided is a private network, comprising:

a cloud intelligent robot in the third aspect or any one of optional implementation manners of the third aspect, at least one network device in the fourth aspect or any one of optional implementation manners of the fourth aspect; wherein, the cloud intelligent robot is connected to a network management system, and the network management system is connected to the network device.

In a sixth aspect, provided in the present invention is another cloud intelligent robot, comprising: a processor, a transmitter, a receiver, a storage medium, and a communication bus; wherein the processor, the transmitter, the receiver, and the storage medium implement communication with each other through the communication bus; the processor is configured to perform the method in the first aspect or any one of optional implementation manners of the first aspect.

In a seventh aspect, provided is another network device, comprising: a processor, a transmitter, a receiver, a storage medium, and a communication bus; wherein the processor, the transmitter, the receiver, and the storage medium implement communication with each other through the communication bus; wherein the processor is configured to perform the method in the second aspect or any one of optional implementation manners of the second aspect.

In an eighth aspect, provided is a computer readable medium for storing a computer program, the computer program comprising an instruction for performing the method in the first aspect or any one of optional implementation manners of the first aspect.

In a ninth aspect, provided is a computer readable medium for storing a computer program, the computer program comprising an instruction for performing the method in the second aspect or any one of optional implementation manners of the second aspect.

Based on the implementation manners provided in the above aspects of the present invention, more implementation manners may be provided with further combination.

Using the above technical solution, a cloud intelligent robot transmits a network monitoring instruction to instruct a network device in a private network to report operation information. According to the operation information reported by the network device, the cloud intelligent robot can diagnose the private network, and initiate a network configuration information update of the private network according to a diagnosis result. In this way, the diagnosis and maintenance of the network do not require the participation of technical personnel, which reduces labor costs and avoids the risk of human leakage. Moreover, since the cloud intelligent robot is a device serving a private network, it can be a part of the private network. Therefore, the present invention also avoids the risk of technology leakage compared with the prior art using a third-party network to access a private network for testing. Furthermore, the cloud intelligent robot automatically diagnoses the private network according to the operation information of the network device, and the efficiency of the diagnosis of the private network is higher than that of the technical personnel according to their own experience.

BRIEF DESCRIPTION OF THE DRAWINGS

In order to more clearly illustrate the embodiments of the present invention or the technical solutions in the prior art, the drawings to be used in the description of the embodiments will be briefly described below. Obviously, the drawings in the following description are some embodiments of the present invention, and a person of ordinary skill in the art can obtain other drawings according to the drawings without any creative efforts.

DETAILED DESCRIPTION OF THE EMBODIMENTS

In order to make the objectives, technical solutions and advantages of the present invention clearer, the technical solutions in the embodiments of the present invention will be described clearly and completely in conjunction with the drawings. Obviously, the embodiments described herein are merely part of embodiments of the present invention rather than all embodiments. All other embodiments obtained by a person of ordinary skill in the art on the basis of the embodiments of the present invention without creative efforts fall within the scope of the present invention.

Figure 1:
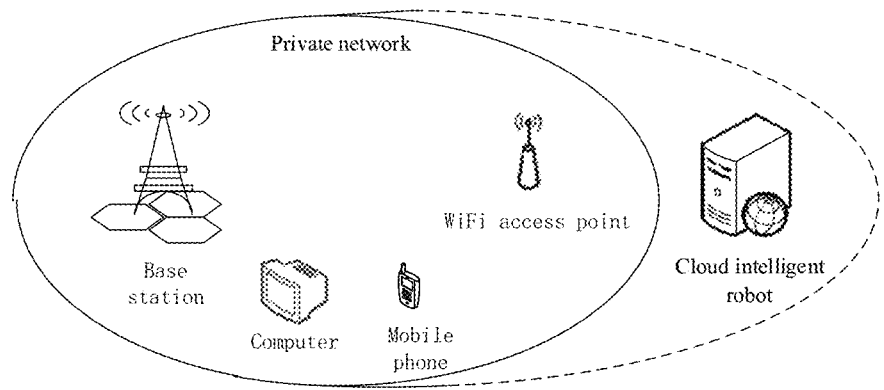
FIG. 1 is a schematic structural diagram of a system of a private network according to an embodiment of the present disclosure.

FIG. 1 is a schematic diagram of an implementation environment of an embodiment of the present invention. As shown in FIG. 1, the implementation environment comprises a private network, wherein the private network comprises multiple types of network devices, such as a base station, a WiFi access point, and a user equipment such as a mobile phone or a computer. The implementation environment further comprises a cloud intelligent robot, wherein the cloud intelligent robot may be a network device in the private network, and the cloud intelligent robot may also be located outside the private network and connected to the private network.

Figure 2:
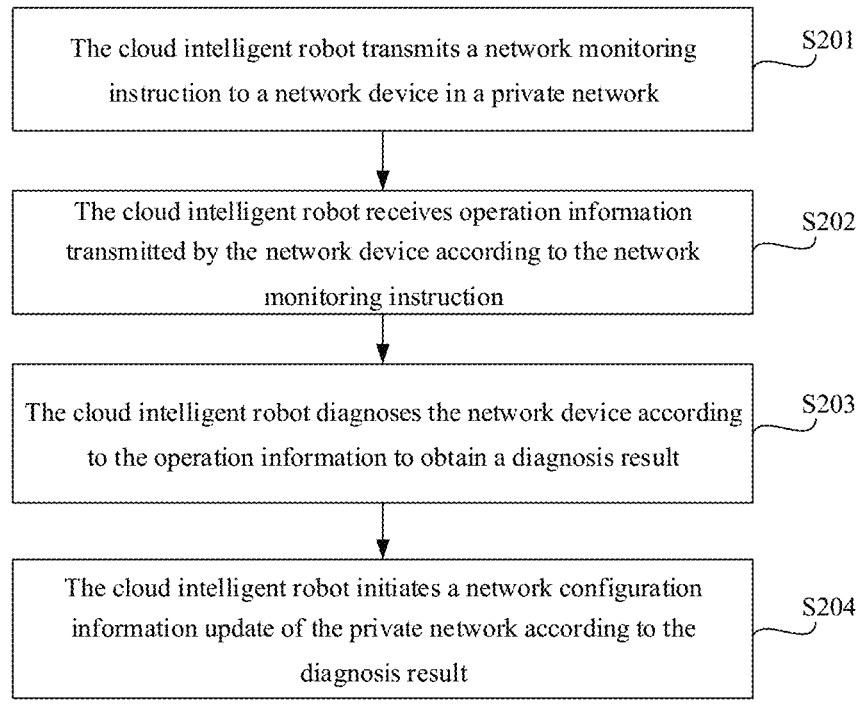
FIG. 2 is a schematic flowchart of a network diagnosis method according to an embodiment of the present invention.

Based on the implementation environment shown in FIG. 1, an embodiment of the present invention provides a network diagnosis method, which is applied to a cloud intelligent robot. As shown in FIG. 2, the method comprises:

S201, the cloud intelligent robot transmitting a network monitoring instruction to a network device in a private network, wherein the cloud intelligent robot may transmit the network monitoring instruction in any of the following signaling: broadcast signaling of a mobile communication network, private control signaling, broadcast information of a private network WiFi access point, control information of a private network WiFi access point, service layer information of an application of a private network, and application layer information of an application of a private network.

For example, in a case where the private network is provided by a basic telecommunications operator for wireless private network services, the cloud intelligent robot can carry the network monitoring instruction in broadcast signaling of a mobile communication network or a control instruction for transmission to the network device; in the case where the private network is provided by a third-party network company for wireless private network services based on WiFi, the cloud intelligent robot can carry the network monitoring instruction in broadcast information or control information of the private network WiFi access point for transmission to the network device.

S202, the cloud intelligent robot receiving operation information transmitted by the network device according to the network monitoring instruction.

S203, the cloud intelligent robot diagnosing the network device according to the operation information to obtain a diagnosis result.

For example, the operation information reported by the network device may comprise at least one of the following information of the network device: pilot signal strength of an access point, service quality information, location information, delay or rate of accessing a specific gateway, interference strength information of a specific frequency, network load information, encryption configuration information, physical layer parameters, MAC (Medium Access Control) layer configuration information, and system broadcast configuration information.

In this way, the cloud intelligent robot can diagnose network coverage, service quality, encryption configuration, etc. of the private network by using the at least one of the above information based on preset diagnostic rules to obtain a diagnosis result.

The above is only an example. In the specific implementation, the operation information reported by the network device may further comprise other information, and the operation information reported by the network device may be set by default, and may be directly reported after receiving the network monitoring instruction. The network monitoring instruction transmitted by the cloud intelligent robot can also instruct which operation information is reported by the network device. And it is not limited by the present invention.

S204, the cloud intelligent robot initiating a network configuration information update of the private network according to the diagnosis result.

Wherein, the diagnosis result may include information indicating a problem existing in the private network, and may further comprise an adjustment suggestion of network configuration information of the private network, which means that after the cloud intelligent robot diagnoses the problem of the private network, the cloud intelligent robot may initiate a network configuration information update of the private network according to the diagnosis result to solve the current problem of the private network.

Specifically, after the cloud intelligent robot obtains a diagnosis result, the diagnosis result may be transmitted to a network management system of a private network, and the network management system updates network configuration information of the private network according to the diagnosis result. Alternatively, the cloud intelligent robot transmits a control instruction to the network management system according to the diagnosis result, and controls the network management system to update network configuration information of the private network. That is to say, the network management system can update the network configuration information of the private network according to the diagnosis result or the control instruction reported by the cloud intelligent robot, and transmit feedback information to the cloud intelligent robot.

Using the above technical solution, a cloud intelligent robot transmits a network monitoring instruction to instruct a network device in a private network to report operation information. According to the operation information reported by the network device, the cloud intelligent robot can diagnose the private network, and initiate a network configuration information update of the private network according to a diagnosis result. In this way, the diagnosis and maintenance of the network do not require the participation of technical personnel, which reduces labor costs and avoids the risk of human leakage. Moreover, since the cloud intelligent robot is a device serving a private network, it can be a part of the private network. Therefore, the present invention also avoids the risk of technology leakage compared with the prior art using a third-party network to access a private network for testing. Furthermore, the cloud intelligent robot automatically diagnoses the private network according to the operation information of the network device, and the efficiency of the diagnosis of the private network is higher than that of the technical personnel according to their own experience.

In order to make a person skilled in the art understand the technical solutions provided by an embodiment of the present invention clearly, the above steps are described in detail below.

In an embodiment of the present invention, the cloud intelligent robot transmits the network monitoring instruction to instruct that the network device in the private network reports the operation information in the following two methods:

Method one, the cloud intelligent robot transmits a network monitoring instruction, and after receiving the network monitoring instruction, the network device in the private network collects its own operation information, and reports the operation information to the cloud intelligent robot.

Figure 3:
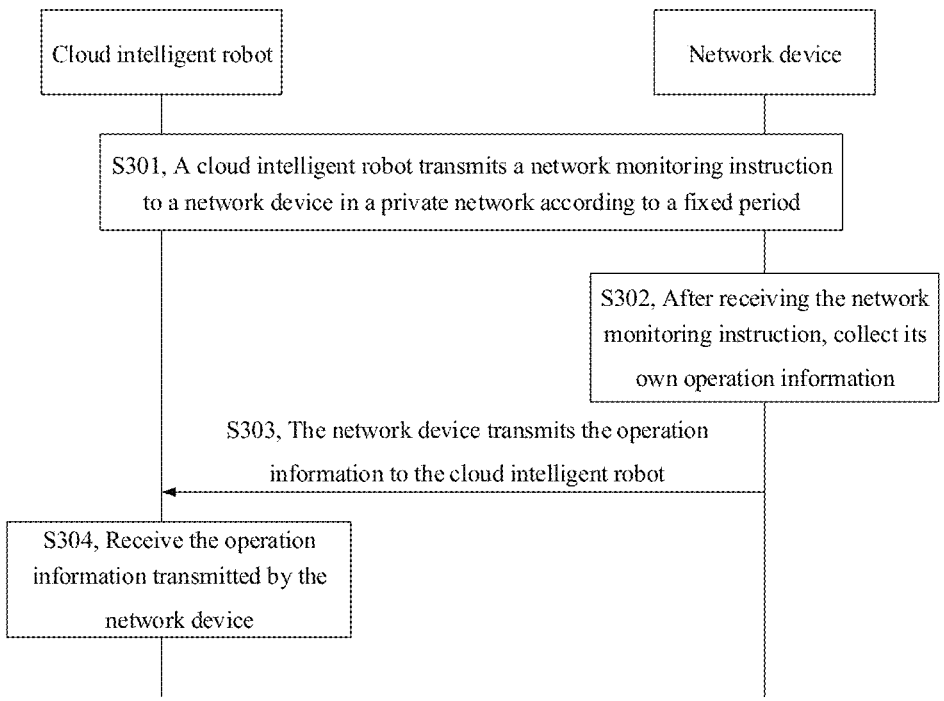
FIG. 3 is a schematic flowchart of a cloud intelligent robot transmitting a network monitoring instruction to instruct a network device to report operation information according to an embodiment of the present disclosure.

For example, as shown in FIG. 3, the method for the cloud intelligent robot to transmit the network monitoring instruction to instruct that the network device in the private network reports the operation information comprises:

S301, a cloud intelligent robot transmitting a network monitoring instruction to a network device in a private network according to a fixed period.

Wherein, the fixed period may be preset.

In a specific implementation, the cloud intelligent robot may broadcast the network monitoring instruction in a private network according to a fixed period, and may also transmit a network monitoring instruction to a network device in a specific area of the private network.

The above is only an example, and the cloud intelligent robot can also transmit the network monitoring instruction at a specified time point, which is not limited by the present invention.

S302, after receiving the network monitoring instruction, the network device collecting its own operation information.

In a possible implementation manner of an embodiment of the present invention, the operation information reported by the network device may be preset, so that the network device may directly collect the operation information after receiving the network monitoring instruction.

In another possible implementation manner of an embodiment of the present invention, the network monitoring instruction comprises reporting instruction information, which is used to instruct which operation information is reported by the network device.

For example, after receiving operation information transmitted by the network device in a previous period, the cloud intelligent robot may determine, according to the operation information, a network device that has a network fault in the private network. Further, the cloud intelligent robot may transmit a network monitoring instruction comprising the reporting instruction information to the network device that has the network fault in the current period, wherein the reporting instruction information is specifically used to instruct the network device to report network configuration information. In this way, after receiving the network configuration information, the cloud intelligent robot can diagnose the cause of the network failure of the network device, and can also generate a recommended value for updating the network configuration.

As indicated in the above example, in the foregoing step S301, the cloud intelligent robot may further transmit a network monitoring instruction to a designated network device, wherein the designated network device may be a network device that has a network fault, a too high network load, or a low service quality. For the cause of the failure of the network device, the cloud intelligent robot can transmit a network monitoring instruction to instruct the network device to report specific operation information, so that the cloud intelligent robot diagnoses the cause of the failure of the network device according to the specific operation information.

S303, the network device transmitting the operation information to the cloud intelligent robot.

S304, the cloud intelligent robot receiving the operation information transmitted by the network device.

Using the method one, the cloud intelligent robot actively acquires the operation information of the network device from the private network, thereby reducing the load of the private network.

Method two, the network monitoring instruction transmitted by the cloud intelligent robot comprises a trigger event for configuring the network device to actively report the operation information, and instructs the network device to transmit its own operation information when the trigger event occurs.

Figure 4:
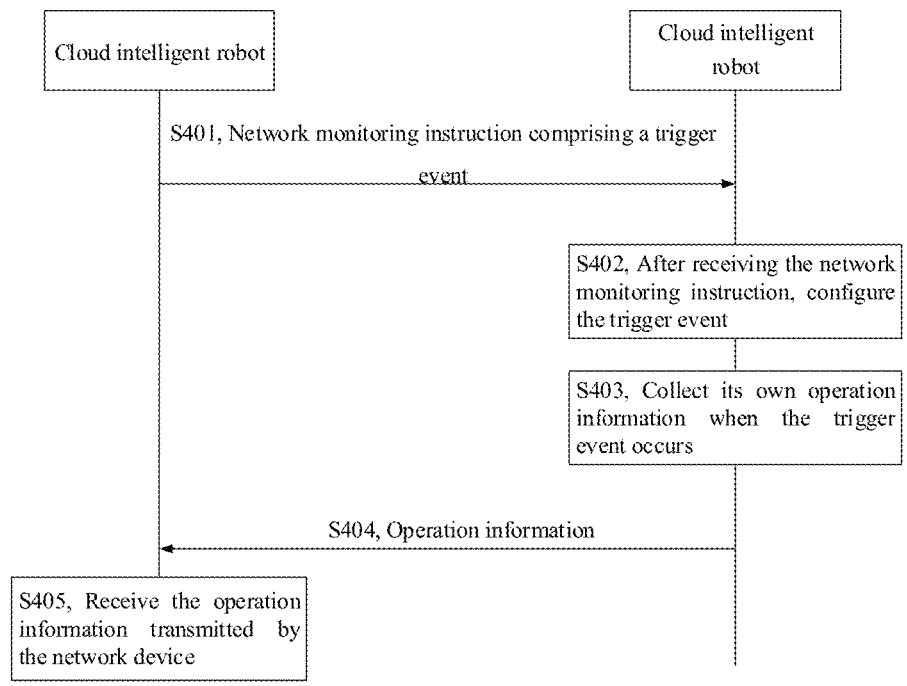
FIG. 4 is a schematic flowchart of another cloud intelligent robot transmitting a network monitoring instruction to instruct a network device to report operation information according to an embodiment of the present disclosure.

For example, as shown in FIG. 4, the method for the cloud intelligent robot to transmit the network monitoring instruction to instruct that the network device in the private network reports the operation information comprises:

S401, a cloud intelligent robot transmitting a network monitoring instruction comprising a trigger event to a network device in a private network.

S402, after receiving the network monitoring instruction, the network device configuring the trigger event.

It is worth noting that the cloud intelligent robot can also transmit the network monitoring instruction to a network management system in the private network, and the network management system configures each network device in the private network.

S403, the network device collecting its own operation information when the trigger event occurs.

For example, in an embodiment of the present invention, the trigger event may comprise at least one of the following events:

a service quality of the network device is lower than a first threshold;

a received private network pilot or reference signal strength of the network device is lower than a second threshold;

a load of the network device is higher than a third threshold;

the network device accesses a private network within a specified period;

the network device enters a preset network coverage area;

the network device accesses a preset WiFi (Wireless Fidelity) access point or a cellular network base station;

the network device performs a preset service; and the network device accesses a preset gateway.

That is to say, when any of the above trigger events occurs on any network device in the private network, the network device is triggered to report the operation information to the cloud intelligent robot.

S404, the network device transmitting the operation information to the cloud intelligent robot.

S405, the cloud intelligent robot receiving the operation information transmitted by the network device.

Using the method two, the cloud intelligent robot can transmit a network monitoring instruction in an initial situation. After the network device is configured according to the trigger event in the network monitoring instruction, the network device actively reports its own operation information when the trigger event occurs, and the cloud intelligent robot does not need to transmit an instruction again to instruct the network device to report.

The methods shown in FIG. 3 and FIG. 4 are only some examples, and in the specific implementation, the above two methods may also be combined. For example, a cloud intelligent robot uses the method two to instruct that a network device in a private network reports pilot signal strength and location information of its own access point when the signal strength is lower than a preset threshold. And after determining that the network device is in a network coverage blind zone according to the pilot signal strength and the location information, the cloud intelligent robot transmits a network monitoring instruction to a base station in the private network by using the method one to instruct each base station to report its own location information and transmitting power information. After receiving the location information and the transmitting power information of each base station, the cloud intelligent robot may generate configuration information for reconfiguring the transmitting power of each base station so as to fully cover the network by adjusting the transmitting power of base station, and to solve the problem of low signal strength of the network device.

In addition to instructing that the network device reports the operation information, the network monitoring instruction transmitted by the cloud intelligent robot to the network device may also comprise at least one of the following information: a data transmission format, a transmission resource location, and an encryption transmission identifier.

The data transmission format is used to instruct a network device to report a transmission format of operation information, such as the modulation and coding mode of the operation information, the encryption format, etc.; the transmission resource location is used to instruct a network device to report the operation information at a specific location; the encryption transmission identifier is used to instruct a network device to report the operation information by using a specific encryption transmission identifier.

Further, the diagnosis of a private network by a cloud intelligent robot based on the operation information in an embodiment of the present invention is specifically described below.

In a possible implementation manner of an embodiment of the present invention, the operation information reported by a network device comprises service quality information and location information of the network device. And the cloud intelligent robot can determine a quality blind zone in the private network according to the service quality information and the location information.

The service quality information may be a packet loss rate, a bit error rate, or a frame loss rate of the network device. In this way, after the cloud intelligent robot receives service quality information and location information reported by each network device, if it is determined that the service quality of each network device in a certain area is lower than the first threshold, the intelligent robot can determine the area as a quality blind zone.

Further, the cloud intelligent robot may further generate configuration information for configuring a base station in the quality blind zone, and the diagnosis result comprises the configuration information.

For example, after the cloud intelligent robot determines that a certain area is a quality blind zone, if the operation information reported by a base station in the quality blind zone includes its own configuration information, the cloud intelligent robot can determine the cause of low service quality according to configuration information of each base station, and generate configuration information for configuring each base station so that the service quality of the network device is improved by adjusting the configuration of each base station.

In another possible implementation manner of an embodiment of the present invention, the operation information comprises interference strength information of a specific frequency. The cloud intelligent robot may perform interference troubleshooting according to the interference strength information of the specific frequency, and the diagnosis result comprises at least one of the following information: identifier information, an interference frequency, and an interference strength of an interference source.

Specifically, the cloud intelligent robot monitors an interference signal at a specific frequency or time point, and can determine whether the network quality degradation of the network device is caused by a specific interference. Further, interference positioning and troubleshooting can be performed, comprising troubleshooting the interference waveform, frequency, strength, and identifier of an interference base station or an access point, thereby determining the identifier of an interference source, the operating frequency of the interference source, and the interference strength.

In another possible implementation manner of an embodiment of the present invention, the operation information reported by a network device comprises a delay or a rate of the network device accessing a specific gateway. In this way, the cloud intelligent robot can troubleshoot a network performance problem of the network device when determining that a delay or a rate of the network device accessing the specific gateway is lower than a fourth threshold.

Specifically, when determining that a delay or a rate of the network device accessing the specific gateway is less than the fourth threshold, the cloud intelligent robot can judge whether the network performance quality problem is caused by the network configuration or the access gateway configuration limitation according to its own network load condition and transmission capability, etc.

Further, the cloud intelligent robot may further generate instruction information for updating a network configuration of the network device, wherein the diagnosis result comprises the indication information. Specifically, the instruction information may be used to instruct that the network device increases the transmission bandwidth with the specific gateway, or the instruction information may be used to instruct that the network device updates the transmission protocol with the specific gateway to improve network performance quality.

In another possible implementation manner of an embodiment of the present invention, the operation information reported by a network device comprises network load information, and the cloud intelligent robot may perform troubleshooting on an overload base station in the private network according to the network load information, wherein the diagnosis result comprises at least one of the following information: identifier information, an overload value, and an overload time period of the overload base station.

Specifically, after receiving the network load information reported by each base station, the cloud intelligent robot can determine whether the network load of the base station is overloaded. If the operation information further comprises location information of each base station, the cloud intelligent robot may further determine whether an overall overload occurs in the base stations in a specific network coverage area, or the cloud intelligent robot may further determine whether each base station is overloaded in a specific time period. In this way, the cloud intelligent robot determines a load balancing solution within the coverage area of the overload network, or a load balancing solution of the overload network device according to the overload condition of each base station.

In another possible implementation manner of an embodiment of the present invention, the operation information reported by a network device comprises encryption configuration information. The cloud intelligent robot can determine whether the encryption configuration information is consistent with expected configuration information, and prompt an invalid encryption when the encryption configuration information is inconsistent with the expected configuration information.

In another possible implementation manner of an embodiment of the present invention, the operation information reported by a network device comprises pilot signal strength of an access point and location information of the network device. The cloud intelligent robot can determine a network coverage blind zone in the private network according to the pilot signal strength and the location information.

Further, the cloud intelligent robot generates configuration information for configuring a transmitting power of a base station adjacent to the network coverage blind zone, wherein the diagnosis result comprises the configuration information. Thus, the network can be fully covered by adjusting the transmitting power of the base station.

It should be noted that the various possible implementation manners are only examples, and in the specific implementation, the possible implementation manners may be combined.

For example, the cloud intelligent robot can determine whether a delay or a rate of the network device accessing the specific gateway is lower than the fourth threshold. When determining that the delay or the rate of the network device accessing the specific gateway is less than the fourth threshold, the cloud intelligent robot generates instruction information for updating a network configuration of the network device. The instruction information may be used to instruct that the network device increases the transmission bandwidth with the specific gateway, or the instruction information may be used to instruct that the network device updates the transmission protocol with the specific gateway. Moreover, the cloud intelligent robot can determine a network coverage blind zone in the private network according to the pilot signal strength and the location information and generate configuration information for configuring a transmitting power of a base station adjacent to the network coverage blind zone. That is to say, in a specific implementation, the cloud intelligent robot can perform one or more possible implementation manners as described above, which is not limited by the present invention.

Moreover, the cloud intelligent robot may initiate an update of the network configuration information on the private network according to the instruction information and the configuration information. For example, the cloud intelligent robot transmits the instruction information and the configuration information to a network management system of the private network, and the network management system increases the transmission bandwidth between the network device and the specific network according to the instruction information, so as to solve the problem that the network device accesses the specific gateway at a low rate. The network management system increases the transmitting power of a base station adjacent to the network coverage blind zone according to the configuration information, so as to achieve full coverage of the network. Alternatively, the cloud intelligent robot may generate a control instruction according to the instruction information and the configuration information, and transmit the control instruction to the network management system to control the network management system to increase transmission bandwidth between the network device and the specific network, and increase the transmitting power of a base station adjacent to the network coverage blind zone.

Using the above method, the cloud intelligent robot can perform comprehensive diagnosis on the network coverage, service quality, and encryption configuration etc. of the private network according to the operation information reported by the network device in the private network. Compared with the technical personnel to diagnose the private network according to their own experience, the efficiency of network diagnosis is improved in an embodiment of the invention improves.

Figure 5:
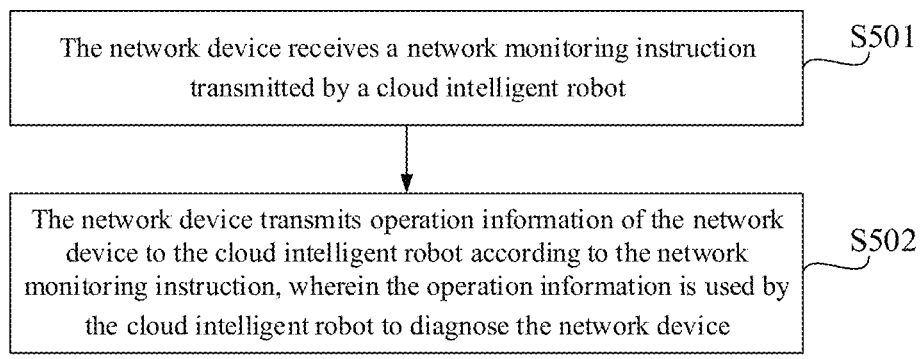
FIG. 5 is a schematic flowchart of another network diagnosis method according to an embodiment of the present invention.

An embodiment of the present invention further provides another network diagnosis method, which is applied to a network device in a private network, as shown in FIG. 5, the method comprising:

S501, the network device receiving a network monitoring instruction transmitted by a cloud intelligent robot.

As shown in FIG. 1, the cloud intelligent robot may be a network device in the private network. The cloud intelligent robot can also be located outside the private network. In that case, the cloud intelligent robot can access the private network through a specific encryption authentication system.

S502, the network device transmitting operation information of the network device to the cloud intelligent robot according to the network monitoring instruction, wherein the operation information is used by the cloud intelligent robot to diagnose the network device.

Wherein, the network device can report the operation information to the cloud intelligent robot according to the network monitoring instruction using two implementation manners, which is specifically described in FIG. 3 and FIG. 4, and details are not described herein again.

Using the above technical solution, a network device in a private network can report its own operation information to the cloud intelligent robot according to the network monitoring instruction transmitted by the cloud intelligent robot, and then the cloud intelligent robot diagnoses the network device. In this way, the diagnosis of the network does not require the participation of technical personnel, which reduces labor costs and avoids the risk of human leakage. Moreover, since the cloud intelligent robot is a device serving a private network, it can be a part of the private network. Therefore, the present invention also avoids the risk of technology leakage compared with the prior art using a third-party network to access a private network for testing. Furthermore, the cloud intelligent robot automatically diagnoses the private network according to the operation information of the network device, and the efficiency of the diagnosis of the private network is higher than that of the technical personnel according to their own experience. The details of the diagnosis of the network device by the cloud intelligent robot can refer to the detailed description of the method embodiment shown in FIG. 1, and details are not described herein again.

Figure 6:
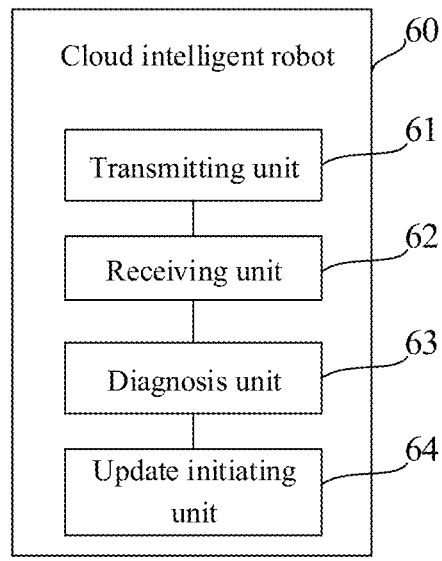
FIG. 6 is a schematic structural diagram of a cloud intelligent robot according to an embodiment of the present invention.

An embodiment of the present invention further provides a cloud intelligent robot 60 for implementing the above network diagnosis method shown in FIG. 1. The cloud intelligent robot 60 belongs to a network device in a private network, or the cloud intelligent robot 60 is connected to the private network through a specific encryption authentication system, as shown in FIG. 6, the cloud intelligent robot 60 comprising:

a transmitting unit 61, configured to transmit a network monitoring instruction to a network device in the private network;

a receiving unit 62, configured to receive operation information transmitted by the network device according to the network monitoring instruction;

a diagnosis unit 63, configured to diagnose the network device according to the operation information to obtain a diagnosis result; and an update initiating unit 64, configured to initiate a network configuration information update of the private network according to the diagnosis result.

The cloud intelligent robot transmits the network monitoring instruction to instruct that the network device reports the operation information by using the following methods:

Method one, the cloud intelligent robot transmits a network monitoring instruction, and after receiving the network monitoring instruction, the network device in the private network collects its own operation information, and reports the operation information to the cloud intelligent robot.

Using the method one, the cloud intelligent robot actively acquires the operation information of the network device from the private network, thereby reducing the load of the private network.

Method two, the network monitoring instruction comprises a trigger event for configuring the network device to actively report the operation information. The receiving unit 62 is configured to: receive the operation information transmitted by the network device when the trigger event occurs.

Using the method two, the cloud intelligent robot can transmit a network monitoring instruction in an initial situation. After the network device is configured according to the trigger event in the network monitoring instruction, the network device actively reports its own operation information when the trigger event occurs, and the cloud intelligent robot does not need to transmit an instruction again to instruct the network device to report.

Moreover, in the method two, the trigger event may comprise at least one of the following events:

a service quality of the network device is lower than a first threshold;

a received private network pilot or reference signal strength of the network device is lower than a second threshold;

a load of the network device is higher than a third threshold;

the network device accesses a private network within a specified period;

the network device enters a preset network coverage area;

the network device accesses a preset WiFi (Wireless Fidelity) access point or a cellular network base station;

the network device performs a preset service; and the network device accesses a preset gateway.

Further, the operation information reported by the network device may comprise at least one of the following information of the network device: pilot signal strength of an access point, service quality information, location information, delay or rate of accessing a specific gateway, interference strength information of a specific frequency, network load information, encryption configuration information, physical layer parameters, MAC (Medium Access Control) layer configuration information, and system broadcast configuration information.

Based on the operation information, the diagnosis unit 63 may be configured to: determine a quality blind zone in the private network according to the service quality information and the location information.

The service quality information may be a packet loss rate, a bit error rate, or a frame loss rate of the network device. In this way, after the cloud intelligent robot receives service quality information and location information reported by each network device, if it is determined that the service quality of the network devices in a certain area is the first threshold, the intelligent robot can determine the area as a quality blind zone.

Further, the diagnosis unit 63 can be also configured to: generate configuration information for configuring a base station in the quality blind zone, wherein the network device comprises a base station, and the diagnosis result comprises the configuration information. For example, after the cloud intelligent robot determines that a certain area is a quality blind zone, if the operation information reported by a base station in the quality blind zone includes its own configuration information, the cloud intelligent robot can determine the cause of low service quality according to configuration information of each base station, and generate configuration information for configuring each base station so that the service quality of the network device is improved by adjusting the configuration of each base station.

Optionally, the diagnostic unit 63 is configured to: perform interference troubleshooting according to the interference strength information of the specific frequency, and the diagnosis result comprises at least one of the following information: identifier information, an interference frequency, and an interference strength of an interference source.

Specifically, the cloud intelligent robot monitors an interference signal at a specific frequency or time point, and can determine whether the network quality degradation of the network device is caused by a specific interference. Further, interference positioning and troubleshooting can be performed, comprising troubleshooting the interference waveform, frequency, strength, and identifier of an interference base station or an access point, thereby determining the identifier of an interference source, the operating frequency of the interference source, and the interference strength.

Optionally, the diagnosis unit 63 is configured to: troubleshoot a network performance problem of the network device when determining that a delay or a rate of the network device accessing the specific gateway is lower than a fourth threshold. Specifically, when determining that a delay or a rate of the network device accessing the specific gateway is less than the fourth threshold, the cloud intelligent robot can judge whether the network performance quality problem is caused by the network configuration or the access gateway configuration limitation according to its own network load condition and transmission capability, etc.

Further, the diagnosis unit 63 is further configured to: generate instruction information for increasing a transmission bandwidth between the network device and the specific gateway or for updating a transmission protocol between the network device and the specific gateway, wherein the diagnosis result comprises the instruction information to improve network performance quality.

Optionally, the diagnostic unit 63 is configured to: perform troubleshooting on an overload base station in the private network according to the network load information, wherein the diagnosis result comprises at least one of the following information: identifier information, an overload value, and an overload time period of the overload base station.

Specifically, after receiving the network load information reported by each base station, the cloud intelligent robot can determine whether the network load of the base station is overloaded. If the operation information further comprises location information of each base station, the cloud intelligent robot may further determine whether an overall overload occurs in the base stations in a specific network coverage area, or the cloud intelligent robot may further determine whether each base station is overloaded in a specific time period. In this way, the cloud intelligent robot determines a load balancing solution within the coverage area of the overload network, or a load balancing solution of the overload network device according to the overload condition of each base station.

Optionally, the diagnostic unit 63 is configured to: determine whether the encryption configuration information is consistent with expected configuration information, and prompt an invalid encryption when the encryption configuration information is inconsistent with the expected configuration information.

Optionally, the diagnostic unit 63 is configured to: determine a network coverage blind zone in the private network according to the pilot signal strength and the location information.

Optionally, the diagnostic unit 63 is configured to: generate configuration information for configuring a transmitting power of a base station adjacent to the network coverage blind zone, wherein the diagnosis result comprises the configuration information. Thus, the network can be fully covered by adjusting the transmitting power of the base station.

In addition, the network monitoring instruction may further comprise at least one of the following information:

a data transmission format for instructing a network device to report a transmission format of the operation information;

a transmission resource location for instructing a network device to report the operation information at a specific location; and an encryption transmission identifier for instructing a network device to report the operation information by using a specific encryption transmission identifier.

Optionally, the transmitting unit 61 is configured to: transmit the network monitoring instruction in any of the following signaling: broadcast signaling of a mobile communication network, private control signaling, broadcast information of a private network WiFi access point, control information of a private network WiFi access point, service layer information of an application of a private network, and application layer information of an application of a private network.

Optionally, the update initiating unit 64 is configured to: transmit the diagnosis result to a network management system of the private network, wherein the diagnosis result is used by the network management system to update network configuration information of the private network;

or transmit a control instruction to the network management system according to the diagnosis result, wherein the control instruction is used to control the network management system to update network configuration information of the private network.

It is worth noting that the unit division of the cloud intelligent robot is only a logical function division. In actual implementation, there may be other division manners. For example, the diagnosis unit 63 and the update initiating unit 64 may belong to one processing unit. In addition, the physical implementation of the above-mentioned functional units may also be implemented in various manners. For example, the diagnostic unit 63 may be a CPU (Central Processing Unit) or an ASIC (Application Specific Integrated Circuit).

For example, the hardware included in the cloud intelligent robot may be a processor, a transmitter, a receiver, a storage medium, and a communication bus, wherein the processor, the transmitter, the receiver and the storage medium implement communication with each other through the communication bus, and the processor is used in a network diagnosis method shown in FIG. 1. The operation performed by the processor may be performed by the cooperation of other devices. For the convenience of description, in embodiments of the present invention, a method for performing network diagnosis by a processor is uniformly described.

In addition, it should be clearly understood by a person skilled in the art that for the convenience and brevity of the description, the specific working process of each unit of the cloud intelligent robot described above may refer to the corresponding process in the above method embodiments, and details will not be described again.

Moreover, in a specific implementation, the cloud intelligent robot 60 may also comprise other devices, which are not shown in FIG. 6.

With the above-mentioned cloud intelligent robot, since the diagnosis and maintenance of the network do not require the participation of technical personnel, the labor cost is reduced, and at the same time, the risk of human leakage is avoided. Moreover, since the cloud intelligent robot is a device serving a private network, it can be a part of the private network. Therefore, the present invention also avoids the risk of technology leakage compared with the prior art using a third-party network to access a private network for testing. Furthermore, the cloud intelligent robot automatically diagnoses the private network according to the operation information of the network device, and the efficiency of the diagnosis of the private network is higher than that of the technical personnel according to their own experience.

Figure 7:
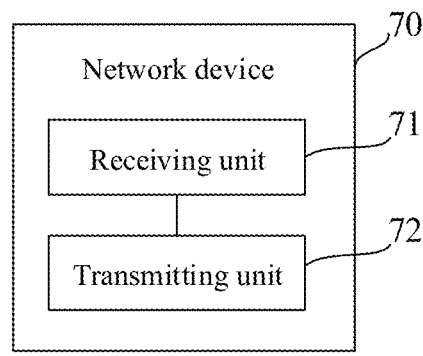
FIG. 7 is a schematic structural diagram of a network device according to an embodiment of the present invention.

An embodiment of the present invention further provides a network device 70 in a private network, which is used to implement the network diagnosis method shown in FIG. 5. As shown in FIG. 7, the network device 70 comprises:

a receiving unit 71, configured to receive a network monitoring instruction transmitted by a cloud intelligent robot;

a transmitting unit 72, configured to transmit operation information of the network device to the cloud intelligent robot according to the network monitoring instruction, wherein the operation information is used by the cloud intelligent robot to diagnose the network device.

It is worth noting that, as shown in FIG. 1, the network device may be any type of network device in a private network, such as a base station, a WiFi access point, and a user equipment such as a mobile phone or a computer.

Optionally, the network monitoring instruction comprises a trigger event for configuring the network device to actively report operation information. The transmitting unit 72 is configured to transmit the operation information to the cloud intelligent robot when the trigger event occurs on the network device.

The trigger event comprises at least one of the following events:

a service quality of the network device is lower than a first threshold;

a received private network pilot or reference signal strength of the network device is lower than a second threshold;

a load of the network device is higher than a third threshold;

the network device accesses a private network within a specified period;

the network device enters a preset network coverage area;

the network device accesses a preset WiFi (Wireless Fidelity) access point or a cellular network base station;

the network device performs a preset service; and the network device accesses a preset gateway.

In a possible implementation manner of an embodiment of the present invention, after receiving the network monitoring instruction, the network device may also directly collect its own operation information and transmit the information to the cloud intelligent robot.

Further, the operation information reported by the network device may comprise at least one of the following information of the network device: the pilot signal strength of the access point, service quality information, location information, delay or rate of accessing a specific gateway, interference strength information for a specific frequency, network load information, encryption configuration information, physical layer parameters, MAC (Medium Access Control) layer configuration information, and system broadcast configuration information.

The method for the cloud intelligent robot to diagnose the network device based on the at least one type of operation information may refer to the corresponding process in the above method embodiments, and details will not be described again.

It is worth noting that the unit division of the network device is only a logical function division. In actual implementation, there may be other division manners. Moreover, the physical implementation of each of the above functional units may also have multiple implementation manners. For example, the hardware included in the network device may be a processor, a transmitter, a receiver, a storage medium, and a communication bus, wherein the processor, the transmitter, the receiver and the storage medium implement communication with each other through the communication bus, and the processor is used in a network diagnosis method shown in FIG. 5. The operation performed by the processor may be performed by the cooperation of other devices. For the convenience of description, in embodiments of the present invention, a method for performing private network diagnosis by a processor is uniformly described.

In addition, it should be clearly understood by a person skilled in the art that for the convenience and brevity of the description, the specific working process of each unit of the network device described above may refer to the corresponding process in the above method embodiments, and details will not be described again.

Moreover, in a specific implementation, the network device 70 may also comprise other devices, which are not shown in FIG. 7.

With the above network device, the network device can report its own operation information to the cloud intelligent robot according to the network monitoring instruction transmitted by the cloud intelligent robot, and then the cloud intelligent robot diagnoses the network device. It requires no third-party network maintenance personnel to enter the office area, thus labor cost is reduced, the risk of leakage is lowered, and the efficiency of network diagnosis is improved. And the details of the diagnosis of the network device by the cloud intelligent robot can refer to the detailed description of the method embodiment shown in FIG. 1, and details are not described herein again.

Figure 8:
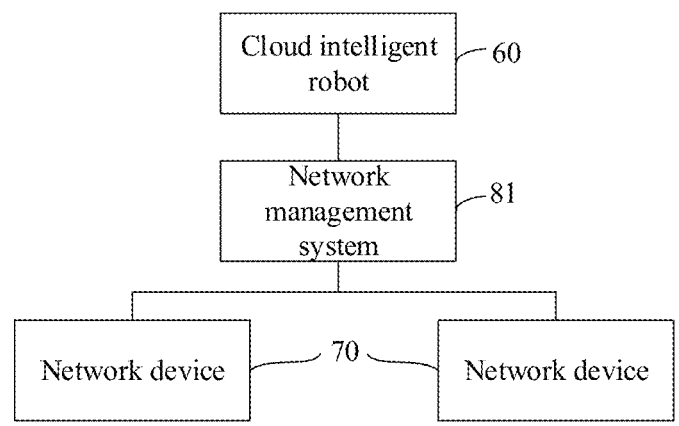
FIG. 8 is a schematic structural diagram of a private network according to an embodiment of the present invention.

An embodiment of the present invention further provides a private network 80. As shown in FIG. 8, the private network 80 comprises: a network management system 81, a cloud intelligent robot 60 as shown in FIG. 6, and at least one network device 70 as shown in FIG. 7.

The network management system 81 is connected to the cloud intelligent robot 60, and the network management system 81 is connected to at least one network device 70.

The details of the cloud intelligent robot 60 and the network device 70 can refer to the above description of FIG. 5 and FIG. 6. It is worth noting that the manner that the cloud intelligent robot described herein transmits the network monitoring instruction to the network device can be that the cloud intelligent robot transmits the network monitoring instruction to the network device through the network management system, and details are not described herein again.

It is worth noting that, in the specific implementation, the cloud intelligent robot may be part of a network management system of a private network, or may also be separately configured from the network management system.

In the several embodiments provided in the present application, it should be understood that the disclosed systems, devices, and methods may be implemented in other ways. For example, the device embodiments described above are merely illustrative. For example, the division of the units is only a logical function division, and there may be other division manners in the actual implementation. For example, multiple units or components may be combined or integrated into another system, or some features may be omitted or not implemented. In addition, the mutual coupling or direct coupling or communication connection shown or discussed may be an indirect coupling or communication connection through some interfaces, devices or units in electrical, mechanical or other forms.

The units described as separate components may or may not be physically separated, and the components displayed as units may or may not be physical units, which may be located in one place, or may be distributed to multiple network units. Some or all of the units may be selected according to actual needs to achieve the objective of the solution of the embodiment.

In addition, functional units in each embodiment of the present invention may be integrated into one processing unit, or each unit may exist physically separately, or two or more units may be integrated into one unit. The above integrated unit can be implemented in the form of hardware or in the form of hardware plus software functional units.

The above integrated unit implemented in the form of software functional units can be stored in a computer readable storage medium. The software functional units described above are stored in a storage medium, comprising several instructions for causing a computer device (which may be a personal computer, a server, or a network device, etc.) to perform partial steps of the methods described in various embodiments of the present invention. The storage medium comprises: a USB flash disk, a mobile hard disk, a Random Access Memory (RAM), a magnetic disk, or an optical disk, and the like which can store data.

The above embodiments are only some specific embodiments of the present invention, but the scope of protection of the present invention is not limited thereto. Any changes or substitutions that may be readily conceived within the scope of protection of the present invention by a person skilled in the art shall fall within the scope of protection of the present invention. Therefore, the scope of protection of the present invention should be determined by the scope of protection of the claims.

The invention claimed is:

1. A network diagnosis method, which is applied to a cloud intelligent robot, comprising:
   the cloud intelligent robot transmitting a network monitoring instruction to a network device in a private network, the cloud intelligent robot is a part of the private network, the private network is a wireless private network service provided by a basic telecommunications operator, the cloud intelligent robot can carry the network monitoring instruction in broadcast signaling of a mobile communication network or a control instruction for transmission to the network device;
   receiving operation information transmitted by the network device according to the network monitoring instruction;
   diagnosing the network device according to the operation information to obtain a diagnosis result; and
   initiating a network configuration information update of the private network according to the diagnosis result;
   wherein the operation information comprises the following information of the network device: a pilot signal strength of an access point, service quality information, location information, a delay or a rate of accessing a specific gateway, interference strength information of a specific frequency, network load information, encryption configuration information, physical layer parameters, MAC (Medium Access Control) layer configuration information, and system broadcast configuration information;
   wherein diagnosing the network device according to the operation information comprises:
   determining a quality blind zone in the private network according to the service quality information and the location information;
   performing interference troubleshooting according to the interference strength information of the specific frequency;
   troubleshooting a network performance problem of the network device when determining that a delay or a rate of the network device accessing the specific gateway is lower than a fourth threshold;
   performing troubleshooting on an overload base station in the private network according to the network load information;
   determining whether the encryption configuration information is consistent with expected configuration information; and prompting an invalid encryption when the encryption configuration information is inconsistent with the expected configuration information; and
   determining a network coverage blind zone in the private network according to the pilot signal strength and the location information.

2. The method of claim 1, wherein the network monitoring instruction comprises a trigger event for configuring the network device to actively report operation information; and
   receiving operation information transmitted by the network device according to the network monitoring instruction comprises:
   receiving the operation information transmitted by the network device when the trigger event occurs.

3. The method of claim 1,
further comprising generating configuration information for configuring a base station in the quality blind zone, wherein the network device comprises the base station, and the diagnosis result comprises the configuration information.

4. The method of claim 1,
further comprising generating instruction information for increasing a transmission bandwidth between the network device and the specific gateway or for updating a transmission protocol between the network device and the specific gateway, wherein the diagnosis result comprises the instruction information.

5. The method of claim 1, wherein the diagnosis result comprises at least one of the following information: identifier information, an overload value, and an overload time period of the overload base station; or
and the method further comprising: generating configuration information for configuring a transmitting power of a base station adjacent to the network coverage blind zone, wherein the diagnosis result comprises the configuration information.

6. The method of claim 1, wherein initiating a network configuration information update of the private network according to the diagnosis result comprises:
transmitting the diagnosis result to a network management system of the private network, wherein the diagnosis result is used by the network management system to update network configuration information of the private network; or
transmitting a control instruction to the network management system according to the diagnosis result, wherein the control instruction is used to control the network management system to update network configuration information of the private network.

7. A network diagnosis method, which is applied to a network device in a private network, comprising:
the network device receiving a network monitoring instruction transmitted by a cloud intelligent robot, the cloud intelligent robot is a part of the private network, the private network is a wireless private network service provided by a basic telecommunications operator, the cloud intelligent robot can carry the network monitoring instruction in broadcast signaling of a mobile communication network or a control instruction for transmission to the network device; and
transmitting operation information of the network device to the cloud intelligent robot according to the network monitoring instruction, wherein the operation information is used by the cloud intelligent robot to diagnose the network device;
wherein the operation information comprises the following information of the network device: a pilot signal strength of an access point, service quality information, location information, a delay or a rate of accessing a specific gateway, interference strength information of a specific frequency, network load information, encryption configuration information, physical layer parameters, MAC (Medium Access Control) layer configuration information, and system broadcast configuration information;
the service quality information is used by the cloud intelligent robot to determine a quality blind zone in the private network according to the service quality information and the location information;
the interference strength information of the specific frequency is used for the cloud intelligent robot to perform interference troubleshooting according to the interference strength information of the specific frequency;
the time delay or rate of accessing the specific gateway is used for the cloud intelligent robot troubleshoot a network performance problem of the network device when determining that a delay or a rate of the network device accessing the specific gateway is lower than a fourth threshold;
the network load information is used for the cloud intelligent robot to perform troubleshooting on an overload base station in the private network according to the network load information;
the encrypted configuration information is used by the cloud intelligent robot to determine whether the encryption configuration information is consistent with expected configuration information; and prompting an invalid encryption when the encryption configuration information is inconsistent with the expected configuration information; and
the strength of the pilot signal and the location information are used by the cloud intelligent robot to determine a network coverage blind zone in the private network according to the pilot signal strength and the location information.

8. The method of claim 7, wherein the network monitoring instruction comprises a trigger event for configuring the network device to actively report operation information; and
transmitting operation information of the network device to the cloud intelligent robot according to the network monitoring instruction comprises:
transmitting the operation information to the cloud intelligent robot when the trigger event occurs on the network device.

9. A cloud intelligent robot, comprising: at least one processor; and
a memory and a communication component, which are in communication connection with the at least one processor, the communication component receiving and/or sending data under the control of the processor, wherein the memory stores instructions executable by the at least one processor, and the instructions are executed by the at least one processor to enable the at least one processor to execute the detection method according to claim 1.

10. A network device, comprising: at least one processor; and
a memory and a communication component, which are in communication connection with the at least one processor, the communication component receiving and/or sending data under the control of the processor, wherein the memory stores instructions executable by the at least one processor, and the instructions are executed by the at least one processor to enable the at least one processor to execute the detection method according to claim 7.

11. A non-transitory computer readable storage medium storing a computer program, wherein the computer program executes the detection method according to claim 1 when being executed by a processor.

12. A non-transitory computer readable storage medium storing a computer program, wherein the computer program executes the detection method according to claim 7 when being executed by a processor.

13. A private network, comprising: a network management system, a cloud intelligent robot of claim 9, and at least one network device of claim 10; wherein, the cloud intelligent robot is connected to a network management system, and the network management system is connected to the network device.

* * * * *